US008750537B2

(12) United States Patent
Poulsen

(10) Patent No.: US 8,750,537 B2
(45) Date of Patent: Jun. 10, 2014

(54) DIFFERENTIAL MICROPHONE CIRCUIT

(75) Inventor: Jens Kristian Poulsen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 245 days.

(21) Appl. No.: 12/960,949

(22) Filed: Dec. 6, 2010

(65) Prior Publication Data

US 2012/0140950 A1 Jun. 7, 2012

(51) Int. Cl.
*H04B 15/00* (2006.01)
*H04R 1/10* (2006.01)

(52) U.S. Cl.
USPC ............................ 381/94.1; 381/94.5; 381/74

(58) Field of Classification Search
CPC .......... H04R 1/08; H04R 1/406; H04R 1/342; H04R 2499/13; H04R 3/005
USPC ............ 381/74, 71.1, 122, 371, 123, 111, 96, 381/77, 56, 57, 94.1–9, 95, 367; 330/69
See application file for complete search history.

(56) References Cited

U.S. PATENT DOCUMENTS 3,512,100 A 5/1970 Killion et al.
5,097,224 A 3/1992 Madaffari et al.
5,589,799 A 12/1996 Madaffari et al.
5,978,491 A 11/1999 Papadopoulos
6,275,112 B1 8/2001 Muza
6,504,937 B1 1/2003 Papadopoulos et al.
6,518,993 B2 * 2/2003 Kerai et al. ................ 348/14.01
6,988,905 B2 1/2006 Corey et al.
7,894,616 B2 2/2011 Song et al.
8,150,058 B2 * 4/2012 Johnson et al. ................. 381/77
8,223,986 B2 * 7/2012 Sander et al. ................... 381/74
2003/0235315 A1 12/2003 Reesor
2005/0147229 A1 7/2005 King
2008/0130911 A1 * 6/2008 Tsen .............................. 381/74
2008/0137896 A1 6/2008 Tsen
2008/0164994 A1 7/2008 Johnson et al.
2009/0214057 A1 8/2009 Lou
2010/0073079 A1 3/2010 Ullen et al.
2011/0268289 A1 * 11/2011 Baranwal et al. ............... 381/74

FOREIGN PATENT DOCUMENTS

EP 0055650 7/1982
EP 1748676 1/2007
WO 9957937 11/1999
WO 2005101902 10/2005

OTHER PUBLICATIONS

Maxim: "Feature Rich, Complete Audio Record/Playback for GSm/GPRS Cell Phones", Application note, Sep. 12, 2005, provided by applicant in the IDS.*

(Continued)

*Primary Examiner* — Vivian Chin
*Assistant Examiner* — Ammar Hamid
(74) *Attorney, Agent, or Firm* — Borden Ladner Gervais LLP; Jeffrey W. Wong

(57) ABSTRACT

An apparatus for a portable electronic device for receiving a jack of a headset, the jack including a set of lines, the set of lines including at least one audio line, a ground signal and a microphone signal line, the apparatus comprising a set of switches for receiving the ground signal line and the microphone signal line and a sensing circuit for reducing induced noise from the headset, wherein the sensing circuit is located between the set of switches and the microphone signal line and ground signal line.

20 Claims, 10 Drawing Sheets

(56) References Cited

OTHER PUBLICATIONS

Jerome Johnston: "A collection of bridge transducer digitizer circuits", Application note, Jan. 31, 1995, Austin Texas, Provided by applicant in IDS.*
Maxim:Feature rich, completeaudio record/playback for GSM. GPRS cell phones.*
Maxim "Feature rich, completer audio record / Playback for GSM, GPRS cell Phones".*
Elliott, Recording and Measurement Microphones, downloaded from http://sound.westhost/.com/project93.htm, Aug. 2002.
Engdahl, Powering Microphones, downloaded from http://www.epanorama.net/circuits/microphone_powering.html, Aug. 2001.
European Patent Office, Examination Report for Application No. 10193885.0, Mar. 15, 2013.
European Patent Office, Examination Report for Patent App. 10193886.8, Apr. 17, 2013.
Nührmann, Transistor-Praxis: Berechnungen Grundschaltungen, Applikationen, Dec. 31, 1986, p. 180, XP002638525, Franzis, Munich.
Maxim, Feature-Rich Complete Audio Record/Playback for GSM/CPRS Cell Phones, Sep. 12, 2005, XP002639104.
Johnston, A Collection of Bridge Transducer Digitizer Circuits, Jan. 31, 1995, XP002639105, Austin, Texas.
European Patent Office, Extended European Search Report for EP Patent App. No. 10193886.8, Jun. 14, 2011.
European Patent Office, Extended European Search Report for EP Patent App. No. 10193885.0, Jun. 14, 2011.
United States Patent and Trademark Office, Office Action for U.S. Appl. No. 12/960,939, Dec. 13, 2012.

* cited by examiner

DIFFERENTIAL MICROPHONE CIRCUIT

FIELD OF THE DISCLOSURE

The present disclosure is generally directed at microphone circuits and more specifically at a differential microphone circuits.

BACKGROUND OF THE DISCLOSURE

Electret microphones have been used for almost half a century since their introduction in 1962. The microphone itself has a very high output impedance due to the capacitance of the electret material. In order to overcome this problem, a junction gate field-effect transistor (JFET) or a complementary metal-oxide semiconductor (CMOS) buffer transistor is integrated within the microphone capsule to change the output impedance. The traditional way to capture the electrical output from these microphones has been to measure the voltage across the microphone, amplify the voltage and then digitize it inside a codec.

BRIEF DESCRIPTION OF THE DETAILED DRAWINGS

Embodiments of the present invention will now be described, by way of example only, with reference to the attached Figures, wherein.

DETAILED DISCLOSURE

Figure 1:
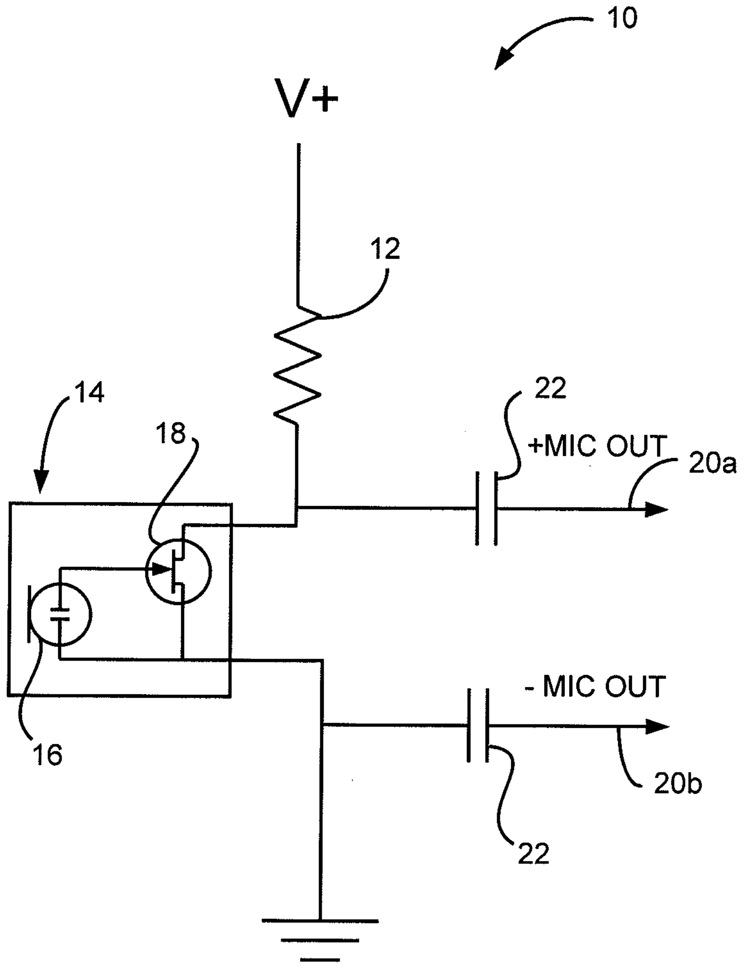
FIG. 1 is a schematic diagram of a microphone circuit.

The current disclosure is directed at embodiments of a differential microphone circuit configuration. In some of the embodiments, the differential microphone circuit configuration provides the advantage of a high power supply rejection ratio (PSRR) or high attenuation of bias noise. In current microphone technology, little attention has been paid to the internal workings of the junction gate field effect transistor (JFET) within the microphone capsule. The JFET operates as a current source with high output impedance In the current disclosure, the electrical output from the microphone is measured across the bias resistor supplying current to the JFET. Since the JFET in the normal bias point works as a current source, any voltage variations and noise from the supply voltage will also happen over the JFET. However, the bias resistor will see an almost completely constant current with the result of a very high PSRR and noise immunity, typically 17-28 dB being achieved. This is an improvement over conventional single ended microphone circuit, and can be accomplished with the same number of or fewer external components. Other advantages include, but are not limited to, improved performance, lower costs and less board space required. The differential microphone circuit may be implemented in various ways but in each configuration similar benefits are achieved. Another advantage of some of the embodiments disclosed within include that the supporting circuitry to the microphone may be less costly and more noisy and still meet microphone specifications. Furthermore any external interference such as from battery noise may be reduced.

In the current disclosure, apparatus for reducing the level of disturbance on microphone lines when a headset is connected to a portable electronic device is disclosed. By having a portable electronic device which may be able to interact with different headsets, i.e. with different ground signal and microphone signal lines, a sensing circuit, such as a Kelvin sensing circuit is integrated within the portable electronic device interface to reduce offset caused by connection with ground.

The present disclosure is directed at embodiments of a differential microphone circuit configuration with a high power supply rejection ratio (PSRR) and high attenuation of bias noise. Different implementations of the circuitry are contemplated such as the microphone circuit being supplied by a negative or a positive bias or the positioning of the bias resistor to have a higher or lower potential than the junction gate field transistor (JFET) within the microphone.

In microphone technology, it is desirous to achieve high power supply rejection ratio (PSRR) and low noise, and this is typically accomplished with filtering components and a special low power supply. Also, various circuit configurations have been proposed in the art to increase the PSRR and noise immunity, typically with a penalty of higher current consumption, higher cost or with the requirement of non-grounded connections. Still, noise and PSRR are regular concerns for the audio electronics designer.

Turning to FIG. 1, a schematic diagram of circuitry within a traditional electret microphone circuit is shown. The circuit 10 includes a bias resistor 12, electret microphone portion 14 (including a two-terminal electret capsule 16 and a JFET 18) and a pair of microphone lines 20 seen as +MIC OUT line 20*a* and –MIC OUT line 20*b*. Each of the microphone lines 20 includes a capacitor 22 which can be used to block out DC signals.

In traditional operation of the microphone of FIG. 1, voltage is supplied to the JFET 18 via the bias resistor 12 and then an output signal taken between the microphone lines 20, or the negative and positive terminals across the microphone. The differential voltage between the two microphone lines 20 may provide a voltage proportional to the acoustic pressure received at the microphone inlet or input.

Figure 2:
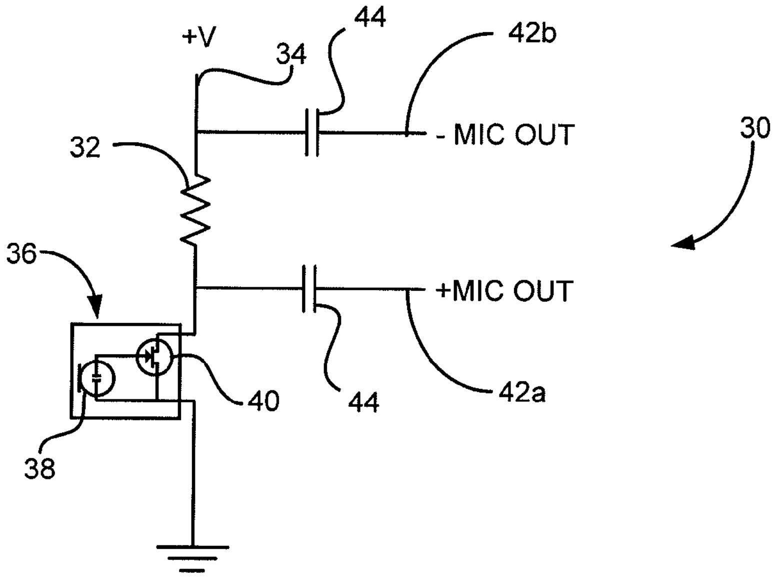
FIG. 2 is a schematic diagram of a microphone circuit in accordance with one embodiment of the disclosure.

Turning to FIG. 2, a schematic diagram of circuitry for a differential microphone circuit in accordance with the disclosure is shown. In this embodiment, the microphone circuit provides the advantage of a higher PSRR and a high attenuation of bias noise.

The microphone circuit 30 comprises a bias resistor 32 which is connected to a voltage source 34 (providing a positive bias) and to an electret microphone circuit 36. The electret microphone circuit 36 is also connected to ground and includes a two-terminal electret capsule 38 and a JFET 40. A pair of microphone lines 42, seen as a +MIC OUT line 42*a* and a −MIC OUT line 42*b* are connected across the bias resistor 32. Each microphone line 42 may include a capacitor 44. Selection of higher resistance values for the bias resistors may result in an increase of acoustic sensitivity, however, the selection of the resistance value for the bias resistor is such that the JFET should not go out of saturation during operation of the microphone circuit.

In another embodiment, a very high bias voltage and a bias resistor with a large resistance value may be used. In this example, a large output signal would be sensed over the microphone lines which may also provide an improved immunity to electromagnetic interference (EMI). In this embodiment, there may be no need for a pre-amplifier circuit.

Operation of the microphone circuit 30 is similar to operation of the traditional microphone circuit of FIG. 1, however the sensing is performed at a different location within the circuit 30. In this embodiment and the ones disclosed below, the sensing of the output signal is performed across the bias resistor 32.

Advantages of measuring the differential voltage or output signal, across the bias resistor include the benefit that the bias resistor 32 experiences an almost constant current which results in the microphone circuit 30 having a very high PSRR and improved noise immunity over other circuits. Another advantage is that the resistance value of the bias resistor 32 may be increased with respect to bias resistors in traditional electret microphone circuits. Another advantage is that by increasing the PSRR or reducing the noise or both within the microphone circuit, fewer components are required to implement the microphone of the current disclosure and therefore the size and cost of the microphone circuit 30 can be reduced with improved performance. Furthermore, implementation of the biasing or sensing circuitry over the bias resistor allows the supporting circuitry of the microphone to be cheaper and noisier while still meeting microphone specifications. Also, any interference from battery noise or any external interference will be lowered.

Figure 3:
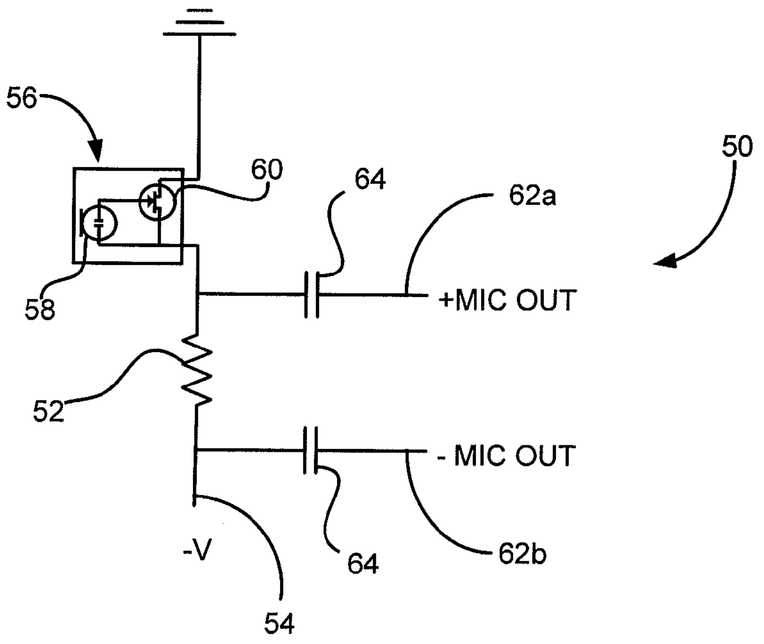
FIG. 3 is a schematic diagram of another embodiment of a microphone circuit.

Turning to FIG. 3, yet another embodiment of a microphone circuit is shown. The microphone circuit 50 includes a bias resistor 52 which is connected to a voltage source 54 (providing a negative bias) and to electret microphone circuit 56. The electret microphone circuit 56 is also connected to ground and includes a two-terminal electret capsule 58 and a JFET 60. A pair of microphone lines 62, seen as a +MIC OUT line 62*a* and a −MIC OUT line 62*b* are connected across the bias resistor 52. Each microphone line 62 may include a capacitor 64. The output signal is then sensed over the microphone lines 62.

Figure 4:
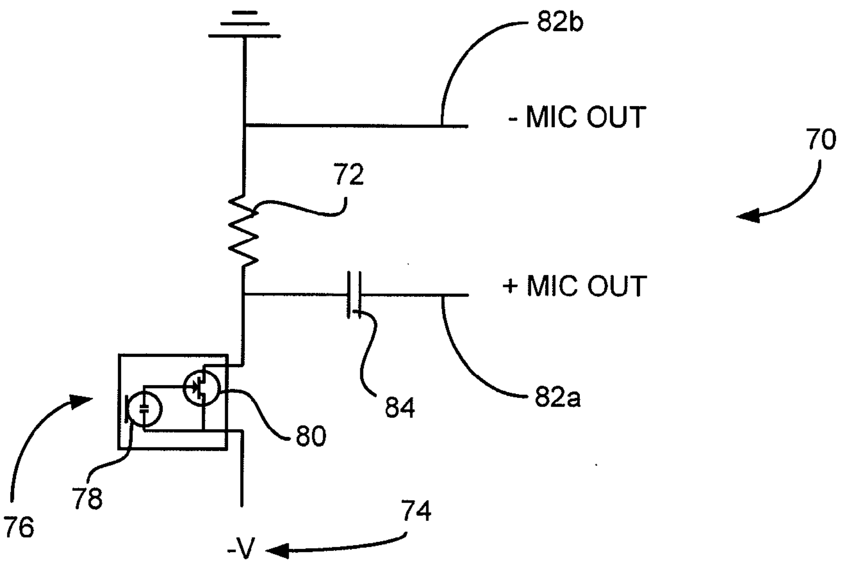
FIG. 4 is a schematic diagram of another embodiment of a microphone circuit.

Turning to FIG. 4, yet another embodiment of a microphone circuit in accordance with the disclosure is shown. The microphone circuit 70 includes a bias resistor 72 which is connected to ground and to electret microphone circuit 76. The electret microphone 76 is also connected to a voltage source 74 (providing a negative bias) and includes a two-terminal electret capsule 78 and a JFET 80. A pair of microphone lines 82, seen as a +MIC OUT line 82*a* and a −MIC OUT line 82*b* are connected across the bias resistor 72. In the current embodiment, the +MIC OUT line 82*a* includes a capacitor 84.

Figure 5:
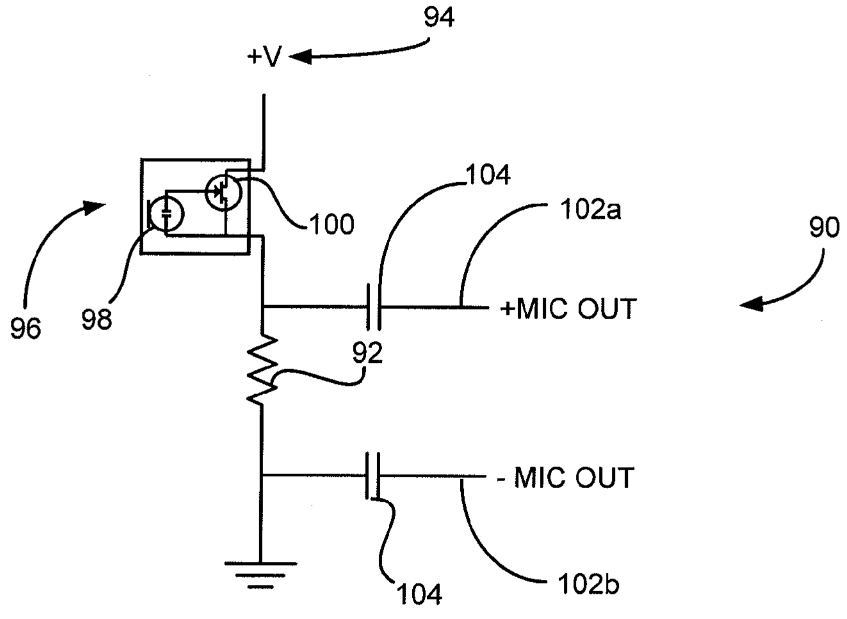
FIG. 5 is a schematic diagram of another embodiment of a microphone circuit.

Turning to FIG. 5, yet another embodiment of a microphone circuit is shown. The microphone circuit 90 includes a bias resistor 92 which is connected to ground and to electret microphone circuit 96. The electret microphone 96 is also connected to a voltage source 94 (providing a positive bias) and includes a two-terminal electret capsule 98 and a JFET 100. A pair of microphone lines 102, seen as a +MIC OUT line 102*a* and a −MIC OUT line 102*b* are connected across the bias resistor 92. In the current embodiment, both of the microphone lines 102 may include a capacitor 104.

Figure 6:
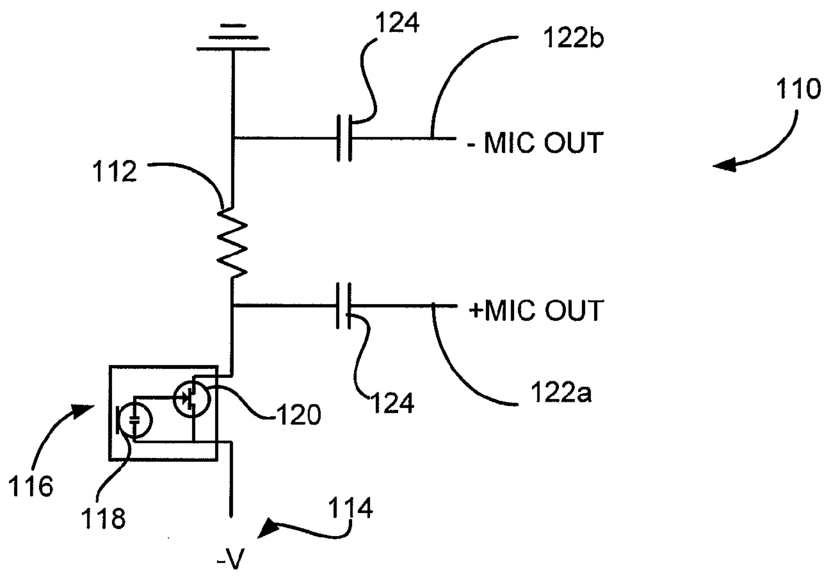
FIG. 6 is a schematic diagram of another embodiment of a microphone circuit.

Turning to FIG. 6, yet another embodiment of a microphone circuit is shown. The microphone circuit 110 includes a bias resistor 112 which is connected to ground and to electret microphone circuit 116. The electret microphone 116 is also connected to a voltage source 114 (providing a negative bias) and includes a two-terminal electret capsule 118 and a JFET 120. A pair of microphone lines 122, seen as a +MIC OUT line 122*a* and a −MIC OUT line 122*b* are connected across the bias resistor 112. In the current embodiment, both of the microphone lines 122 may include a capacitor 124.

Figure 7:
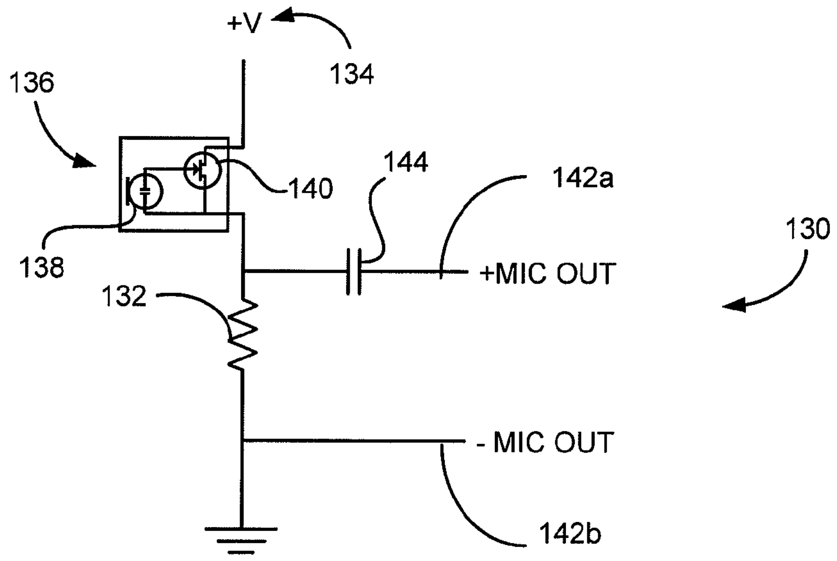
FIG. 7 is a schematic diagram of another embodiment of a microphone circuit.

Turning to FIG. 7, yet another embodiment of a microphone circuit is shown. The microphone circuit 130 includes a bias resistor 132 which is connected to ground and to electret microphone circuit 136. The electret microphone 136 is also connected to a voltage source 134 (providing a positive bias) and includes a two-terminal electret capsule 138 and a JFET 140. A pair of microphone lines 142, seen as a +MIC OUT line 142*a* and a −MIC OUT line 142*b* are connected across the bias resistor 132. In the current embodiment, a capacitor 144 is located on the +MIC OUT line 142*a*.

Figure 8:
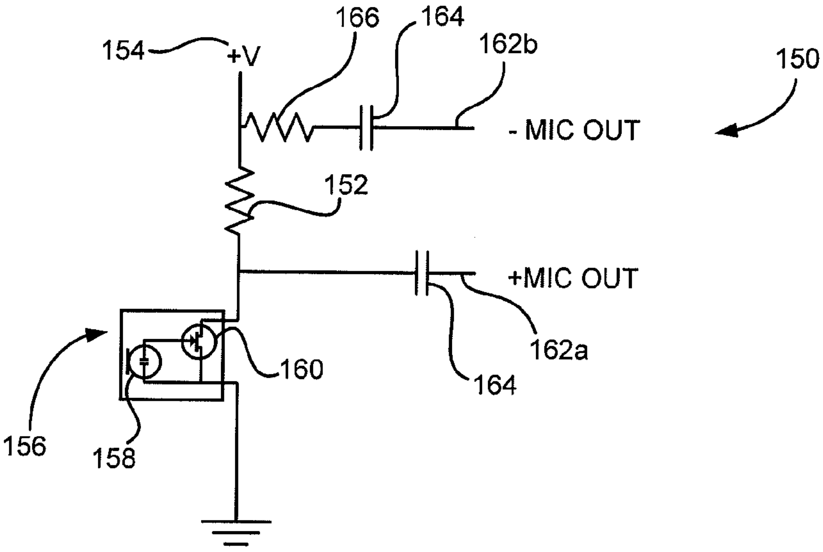
FIG. 8 is a schematic diagram of another embodiment of a microphone circuit.

Turning to FIG. 8, yet another embodiment of a microphone circuit is shown. The microphone circuit 150 includes a bias resistor 152 which is connected to a voltage source 154 (providing a positive bias) and to electret microphone circuit 156. The electret microphone 156 is also connected to ground and includes a two-terminal electret capsule 158 and a JFET 160. A pair of microphone lines 162, seen as a +MIC OUT line 162*a* and a −MIC OUT line 162*b* are connected across the bias resistor 152. In the current embodiment, each microphone line 162 includes a capacitor 164 and the −MIC OUT line 162*b* also includes a resistor, or resistive element 166 although the capacitors 164 and resistive elements 166 are not mandatory components.

Figure 9:
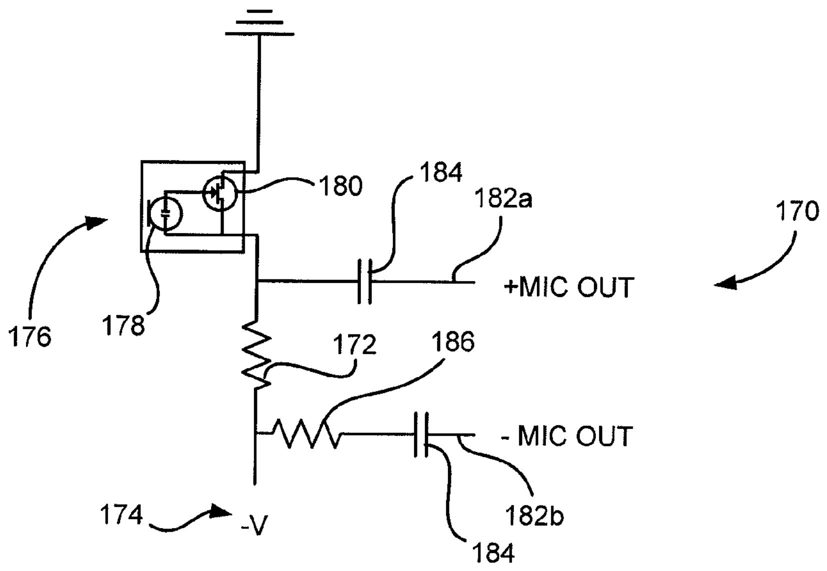
FIG. 9 is a schematic diagram of another embodiment of a microphone circuit.

Turning to FIG. 9, yet another embodiment of a microphone circuit is shown. The microphone circuit 170 includes a bias resistor 172 which is connected to a voltage source 174 (providing a negative bias) and to electret microphone circuit 176. The electret microphone 176 is also connected to ground and includes a two-terminal electret capsule 178 and a JFET 180. A pair of microphone lines 182, seen as a +MIC OUT line 182*a* and a −MIC OUT line 182*b* are connected across the bias resistor 172. In the current embodiment, each microphone line 182 includes a capacitor 184 and the −MIC OUT line 182*b* also includes a resistor, or resistive element 186.

Figure 10:
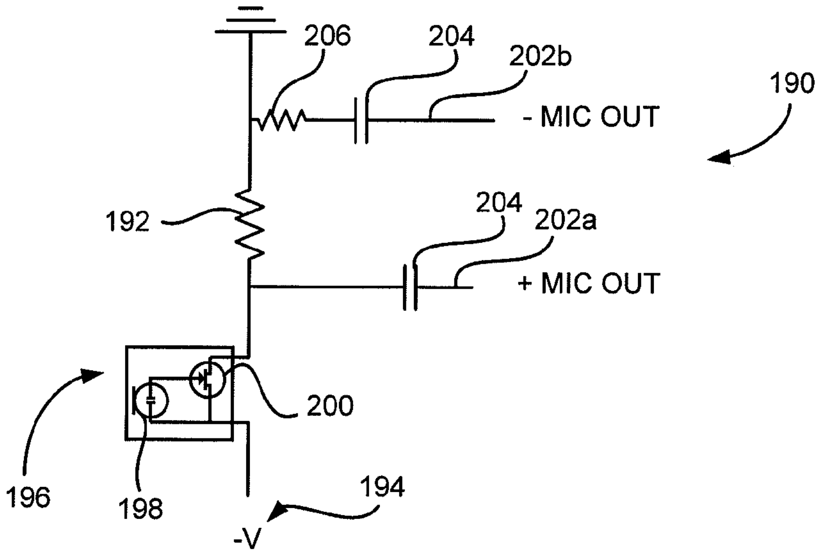
FIG. 10 is a schematic diagram of another embodiment of a microphone circuit.

Turning to FIG. 10, yet another embodiment of a microphone circuit is shown. The microphone circuit 190 includes a bias resistor 192 which is connected to ground and to electret microphone circuit 196. The electret microphone 196 is also connected to a voltage source 194 (providing a negative bias) and includes a two-terminal electret capsule 198 and a JFET 200. A pair of microphone lines 202, seen as a +MIC OUT line 202*a* and a −MIC OUT line 202*b* are connected across the bias resistor 192. In the current embodiment, each microphone line 202 includes a capacitor 204 and the −MIC OUT line 202*b* also includes a resistor, or resistive element 206.

Figure 11:
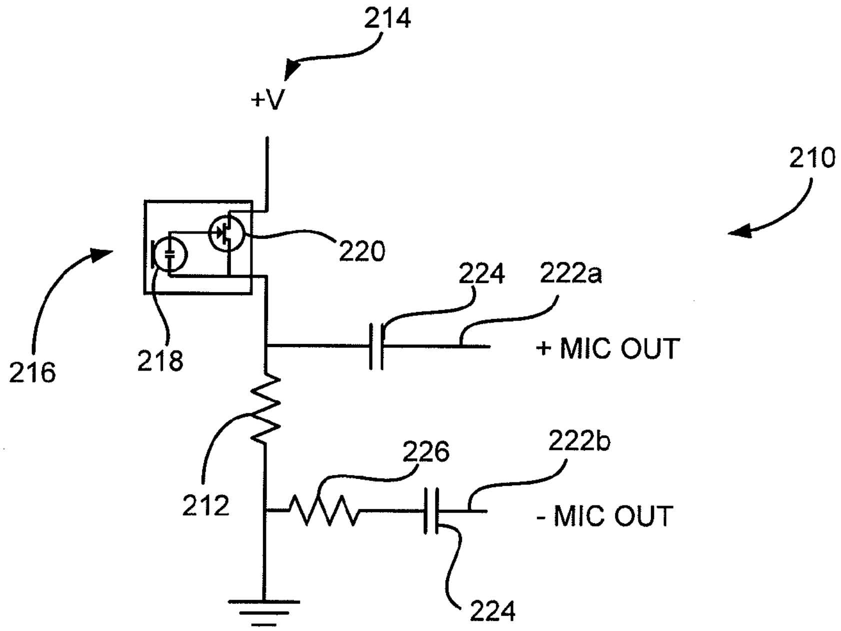
FIG. 11 is a schematic diagram of another embodiment of a microphone circuit.

Turning to FIG. 11, yet another embodiment of a microphone circuit is shown. The microphone circuit 210 includes a bias resistor 212 which is connected to ground and to electret microphone circuit 216. The electret microphone 216 is also connected to a voltage source 214 (providing a positive bias) and includes a two-terminal electret capsule 218 and a JFET 220. A pair of microphone lines 222, seen as a +MIC OUT line 222*a* and a −MIC OUT line 222*b* are connected across the bias resistor 212. In the current embodiment, both of the microphone lines 222 may include a capacitor 224 while the −MIC OUT line 222*b* also includes a resistive element, seen as resistor 226.

Figure 12:
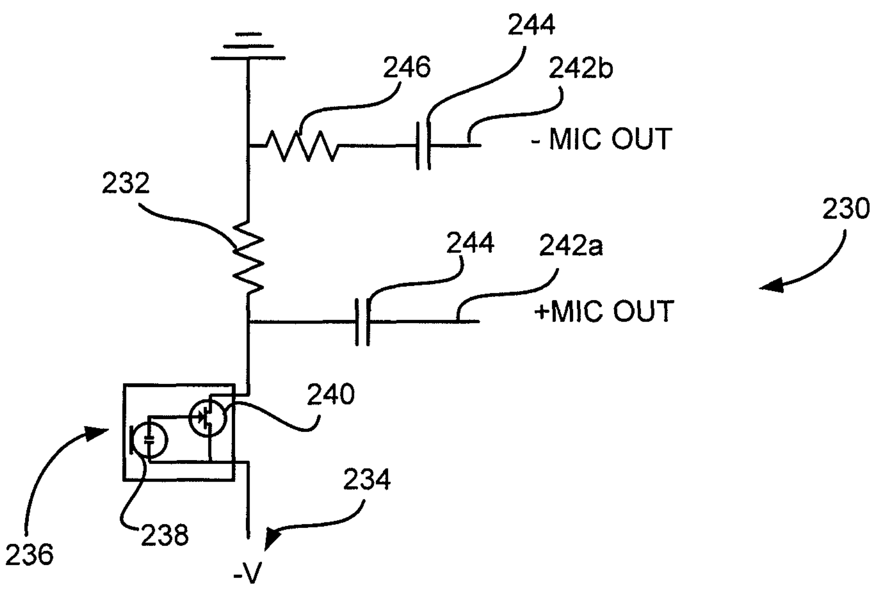
FIG. 12 is a schematic diagram of another embodiment of a microphone circuit.

Turning to FIG. 12, yet another embodiment of a microphone circuit is shown. The microphone circuit 230 includes a bias resistor 232 which is connected to ground and to electret microphone circuit 236. The electret microphone 236 is also connected to a voltage source 234 (providing a negative bias) and includes a two-terminal electret capsule 238 and a JFET 240. A pair of microphone lines 242, seen as a +MIC OUT line 242*a* and a −MIC OUT line 242*b* are connected across the bias resistor 232. In the current embodiment, both of the microphone lines 242 may include a capacitor 244 and the −MIC OUT line 242*b* includes a resistive element 246.

Figure 13:
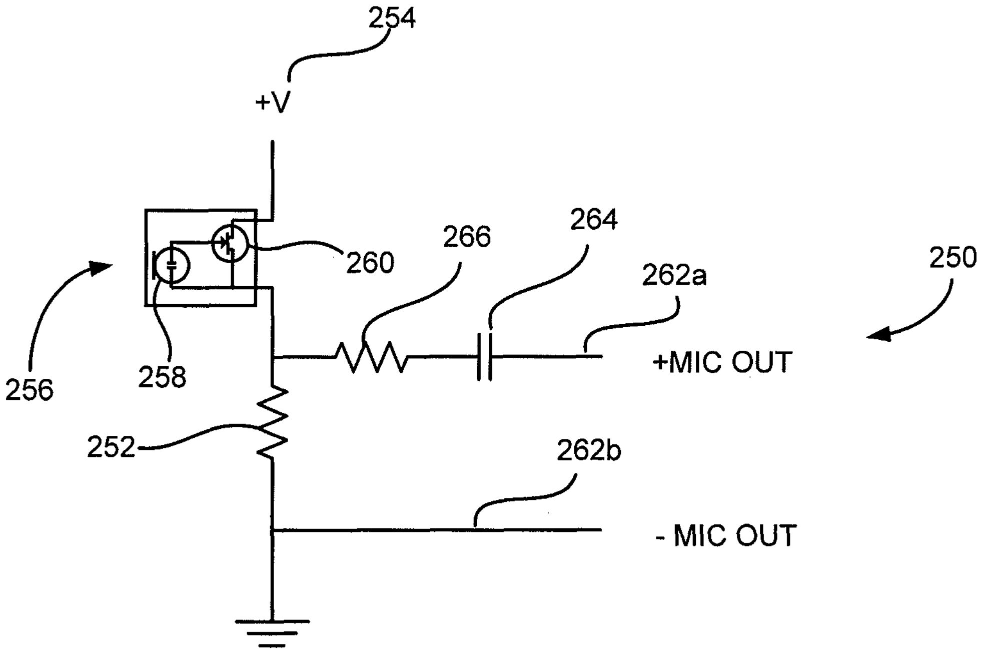
FIG. 13 is a schematic diagram of another embodiment of a microphone circuit.

Turning to FIG. 13, yet another embodiment of a microphone circuit is shown. The microphone circuit 250 includes a bias resistor 252 which is connected to ground and to electret microphone circuit 256. The electret microphone 256 is also connected to a voltage source 254 (providing a positive bias) and includes a two-terminal electret capsule 258 and a JFET 260. A pair of microphone lines 262, seen as a +MIC OUT line 262*a* and a −MIC OUT line 262*b* are connected across the bias resistor 252. In the current embodiment, a capacitor 264 is located on the +MIC OUT 262*a* along with a resistive element 266.

Another benefit of the embodiments of FIGS. 2 to 13 is that when the JFET within the preamplifier is biased in a particular setup, the JFET functions as a current source with a high output impedance. This allows for a bias resistor with a higher resistive value to be implemented within the microphone circuit, thereby increasing the acoustic sensitivity of the microphone. In the preferred embodiment, the resistive value for the bias resistor is selected so that after the voltage drop over the bias resistor there is enough voltage supplied to the JFET so that it does not go out of saturation.

Furthermore, by having a high value resistive value for the bias resistor along with a high bias voltage, a high output signal would be experienced over the microphone lines and therefore, reduce the needed gain for any following stages In a further embodiment of the disclosure, in order to provide further noise reduction within the circuit when this circuit is combined with ground switching, such as via ground noise, a extra set of switches can be implemented within the microphone circuit as will be discussed below.

Figure 14:
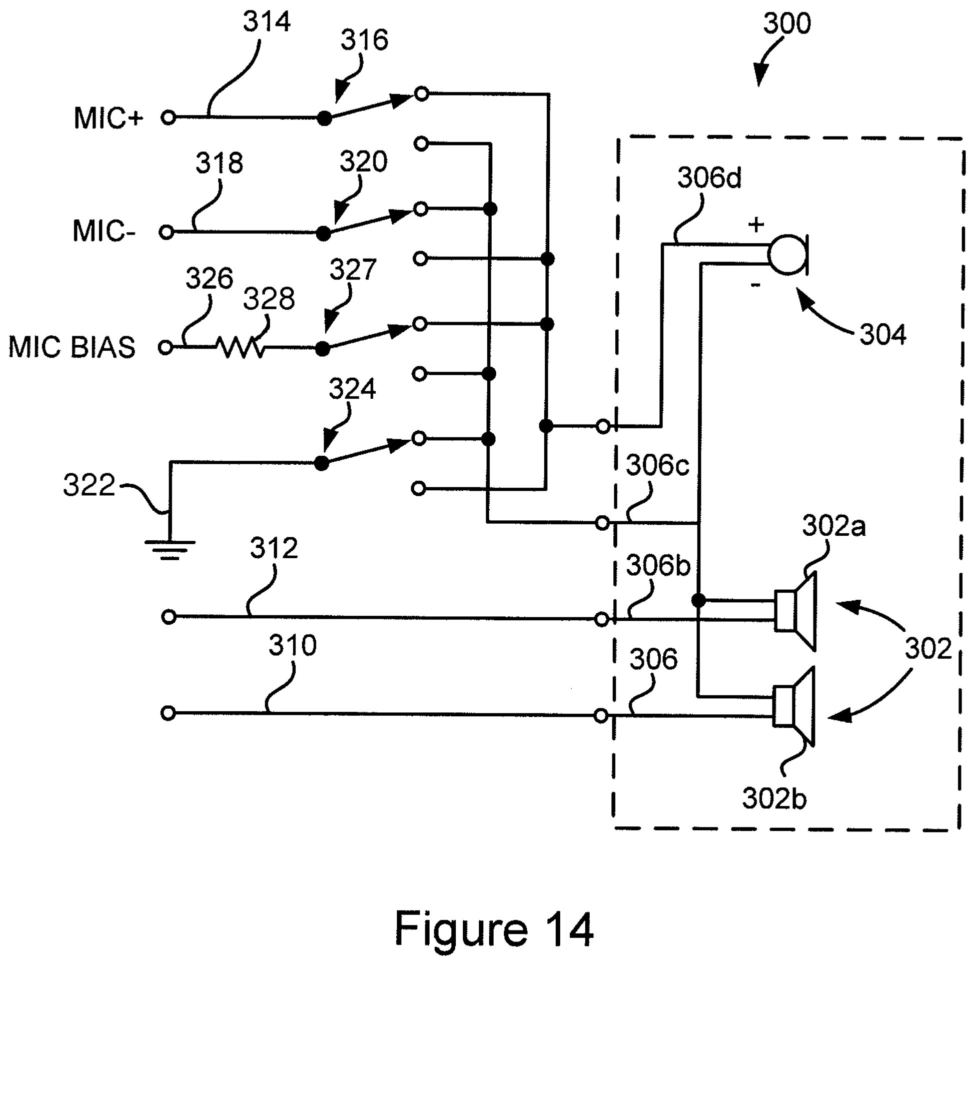
FIG. 14 is a schematic diagram of a headset connected with a portable electronic device in a first mode.

As schematically shown in FIG. 14, further circuitry for use with a headset is shown. The headset 300 includes a pair of speakers 302, seen as a right headset speaker 302*a* and a left headset speaker 302*b*, and a microphone 304. Alternatively, the headset may include only one headphone. The headset 300 further includes a jack (represented by wires 306) which may be inserted into a portable electronic device, such as via a port, in order to connect the headset with the device. As schematically shown, the jack includes four separate wires which are a left speaker audio line 306*a*, a right speaker audio line 306*b*, a ground signal line 306*c* and a microphone signal line 306*d*. In this embodiment, the left speaker 302*b* is connected to the left speaker audio line 306*a* and to the ground line 306*c*. The right speaker 302*a* is connected to the right speaker audio line 306*b* and the ground signal line 306*c* while the microphone is connected to the microphone signal line 306*d* and the ground line 306*c*.

Within the device, the left speaker audio line 306*a* is connected to a left headphone output signal (HPL) signal line 310 while the right speaker audio line 306*b* is connected to a right headphone output signal (HPR) signal line 312. In one embodiment the lines are communicatively connected via the ports.

A MIC+ line 314, such as the +MIC OUT lines of FIGS. 2 to 13, is connected via a switch 316 to the microphone signal line 306*d*. Similarly, a MIC− line 318, such as the −MIC OUT line of FIGS. 2 to 13, is connected via a switch 320 to the ground signal line 306*c*. As some headsets have different ground connections, the switches 316 and 320 enable the portable electronic device to support headsets that have ground and microphone signal reversed, as in FIG. 15. A ground signal 322 is also connected via a switch 324 to the ground signal line 306*c* in FIG. 14. A MIC Bias voltage signal 326 is connected to the microphone signal line 306*d* via a switch 327 after passing a resistor 328.

In the current embodiment, such as for use with a first headset, the switches 316 and 327 are set such that the MIC+ line 314 and the MIC Bias lines are connected to the microphone signal line 306*c*. The switches 320 and 324 are set such that the MIC− line 318 and the ground reference voltage 322 are connected to the ground signal line 306*d*.

Figure 15:
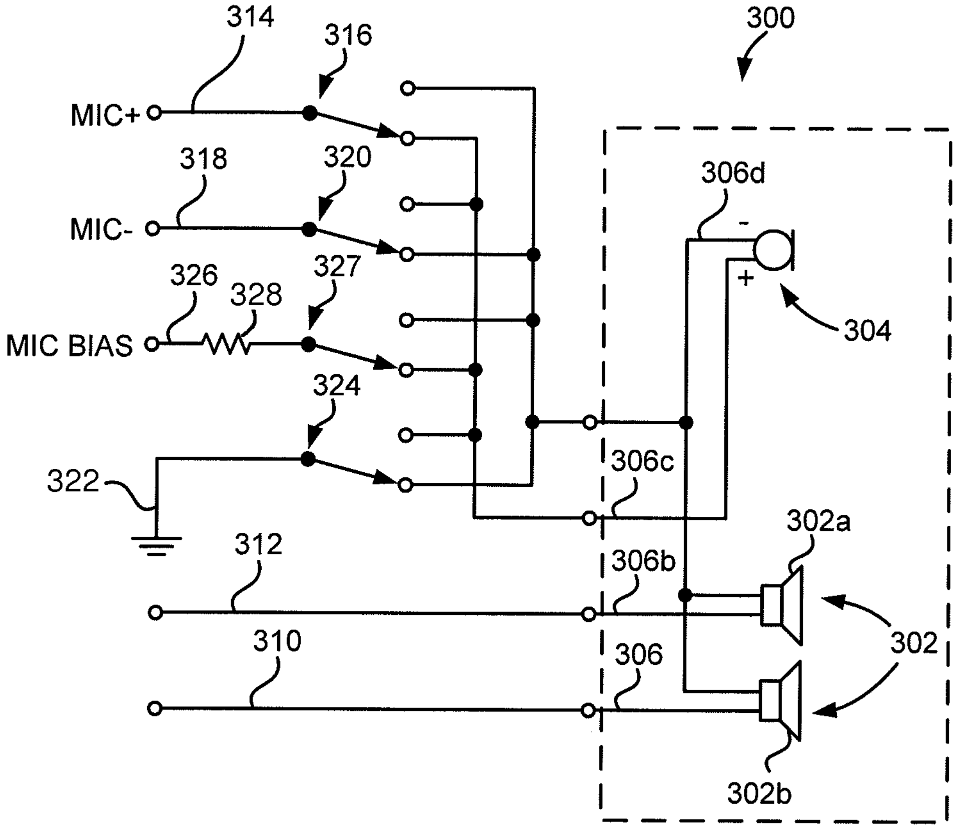
FIG. 15 is a schematic diagram of another headset connected with a portable electronic device in a second mode.

In the embodiment of FIG. 15, such as for use with a second headset with the ground signal line and microphone signal line reversed (from the viewpoint of the device), the switches 316 and 327 are set such that the MIC+ line 314 and MIC Bias are connected to the ground signal line 306*c* and switches 320 and 324 connect the MIC− line and the ground reference voltage 322 to the microphone line 306*d*. The advantage of using separate switches for the microphone signals and for the ground current switch is that the voltage that will be generated over the ground switch will not be sensed by the microphone input terminals, since these switches are placed after the ground switch. This will be described in more detail with respect to FIG. 16.

Each of the pair of speakers 302 is connected to respective audio lines 304*a* and 304*b* which provide the audio signals to the user via the speakers 302. The audio signals are generated by the portable electronic device and transmitted to the headset via the jack which is connected to the device, typically via a port.

Figure 16:
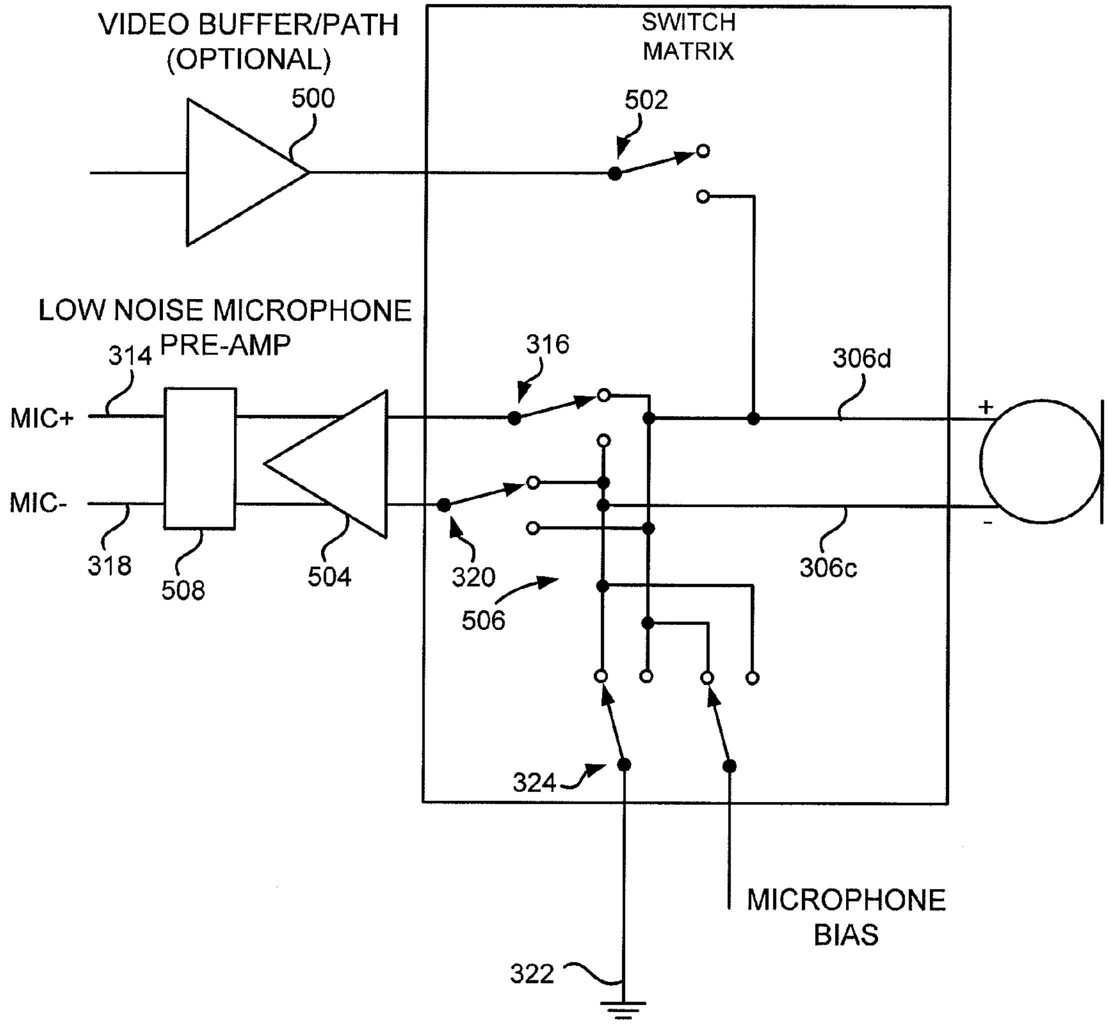
FIG. 16 is a schematic diagram of another embodiment of an apparatus for connecting a portable electronic device with a headset.

Turning to FIG. 16, a more detailed schematic of the connections between a portable electronic device and a headset is shown. In the embodiment shown in FIG. 16, the headset is connected to a chip within the device. The chip may be a switch matrix having ports for receiving the individual lines within the jack of the headset.

A video buffer or path (represented by amplifier 500) may also be connected to the microphone line 306*d* of the headset via a switch 502. The video buffer or path is not a necessary part but may be included in various embodiments. The MIC+ line 314 and the MIC− line 316 are connected to a low noise microphone pre-amplifier 504.

In the embodiment of FIG. 16, the MIC+ line 314 and the MIC− line 316 are connected to the microphone signal line 306*d* and the ground signal line 306*c* via a sensing circuit, such as a Kelvin sensing circuit 506. By including a sensing circuit between the switches and ground 322 and the headset, the microphone input (signals along lines MIC+ and MIC−), the effect of any changes to the ground potential 322 will be reduced. A delta-sigma connector 508 may also be located within the device for digitizing analog signals.

Kelvin sensing may be used on the microphone lines (MIC+ and MIC−) to reduce the affect on the microphone input by changes in or the ground signal 322, or ground potential itself. The switch 324 for the ground line will still be modulated by signals from the headset, but the microphone shall use the signal before this switch 324 to reduce the effect of the modulation. Thus, the microphone pre-amplifier 504 shall sense the differential signal at the jack, before the ground switch 324. Furthermore the switched microphone ground signal may be used in another configuration for reducing or eliminating any ground potential offset observed by the headset or the device (ground loop elimination)

In one embodiment, for economic and space reasons, this is most economically achieved via low-resistance switches for the ground switching, while somewhat larger resistance switches may be used for the separate set of switches used to carry the microphone signals. As an example, a resistance of 0.5Ω may be used for switching the ground line, while a resistance of 10Ω may be used to switch the microphone lines. In this manner, a larger resistance may be used for the differential microphone input since the input impedance is high and the output from the microphone itself is also relatively high as compared to the headphone impedances.

In the preceding description, for purposes of explanation, numerous details are set forth in order to provide a thorough understanding of the embodiments of the disclosure. However, it will be apparent to one skilled in the art that these specific details are not required in order to practice the disclosure. In other instances, well-known electrical structures and circuits are shown in block diagram form in order not to obscure the disclosure. For example, specific details are not provided as to whether the embodiments of the disclosure described herein are implemented as a software routine, hardware circuit, firmware, or a combination thereof.

The above-described embodiments of the disclosure are intended to be examples only. Alterations, modifications and variations can be effected to the particular embodiments by those of skill in the art without departing from the scope of the disclosure, which is defined solely by the claims appended hereto.

What is claimed is:

1. An apparatus for a portable electronic device for receiving a jack of a headset, the jack including a set of lines, the set of lines including at least one audio line, a ground signal and a microphone signal line, the apparatus comprising:

a set of switches to receive the ground signal line and the microphone signal line of the jack; and a sensing circuit to reduce induced noise from the headset;

wherein the sensing circuit is located between the set of switches and the microphone signal line and ground signal line of the jack.

2. The apparatus of claim 1 wherein the sensing circuitry comprises a Kelvin sensing circuit.

3. The apparatus of claim 1 wherein the set of switches are connected to a pair of microphone lines within the portable electronic device.

4. The apparatus of claim 3 wherein the pair of microphone lines comprises a MIC+ line and a MIC− line.

5. The apparatus of claim 4 wherein a pre-amplifier is connected to the set of switches via the MIC+ line and the MIC− line.

6. The apparatus of claim 1 further comprising a video path connected to the microphone signal line.

7. The apparatus of claim 6 wherein the video path is connected to the microphone signal line via a switch.

8. The apparatus of claim 1 wherein the set of switches includes a ground switch to connect a ground reference voltage to one of the ground signal line and the microphone signal line.

9. The apparatus of claim 1 wherein the set of switches and the sensing circuit are integrated with a chip.

10. The apparatus of claim 9 wherein the chip comprises a switch matrix.

11. A portable electronic device comprising:

an audio port configured to receive a plug of an external audio device, the plug including at least one audio line, a ground signal and a microphone signal line;

a set of switches electrically connected to the audio port and configured to receive the ground signal line and the microphone signal line of the plug; and sensing circuitry to reduce induced noise from the headset and configured between the set of switches and the microphone signal line and ground signal line of the plug.

12. The portable electronic device of claim 11 wherein the sensing circuitry comprises a Kelvin sensing circuit.

13. The portable electronic device of claim 11 wherein the set of switches are connected to a pair of microphone lines within the portable electronic device.

14. The portable electronic device of claim 13 wherein the pair of microphone lines comprises a MIC+ line and a MIC− line.

15. The portable electronic device of claim 14 wherein a pre-amplifier is connected to the set of switches via the MIC+ line and the MIC− line.

16. The portable electronic device of claim 11 further comprising a video path connected to the microphone signal line.

17. The portable electronic device of claim 16 wherein the video path is connected to the microphone signal line via a switch.

18. The portable electronic device of claim 11 wherein the set of switches includes a ground switch to connect a ground reference voltage to one of the ground signal line and the microphone signal line.

19. The portable electronic device of claim 11 wherein the set of switches and the sensing circuit are integrated with a chip.

20. The portable electronic device of claim 19 wherein the chip comprises a switch matrix.

* * * * *